US007391504B1

(12) United States Patent
Pinkus et al.

(10) Patent No.: US 7,391,504 B1
(45) Date of Patent: Jun. 24, 2008

(54) LOW COST NIGHT VISION APPARATUS AND COCKPIT LIGHTING COMPATIBILITY EVALUATION VIA VISUAL ACUITY

(75) Inventors: Alan R. Pinkus, Bellbrook, OH (US); Harry L. Task, Tucson, AZ (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 260 days.

(21) Appl. No.: 11/311,588

(22) Filed: Dec. 14, 2005

(51) Int. Cl.
*G01C 3/08* (2006.01)
*G01D 18/00* (2006.01)

(52) U.S. Cl. .................... 356/4.01; 250/252.1
(58) Field of Classification Search ............ 356/4.01, 356/4.07, 6; 250/252.1; 351/239, 243
See application file for complete search history.

(56) References Cited

U.S. PATENT DOCUMENTS

| | | | |
|---|---|---|---|
| 2,385,992 A * | 10/1945 | Jobe ........................... | 351/239 |
| 3,730,985 A | 5/1973 | Whitney | |
| 4,309,608 A | 1/1982 | Adamson, Jr. et al. | |
| 4,328,516 A | 5/1982 | Colpack et al. | |
| 4,607,923 A | 8/1986 | Task et al. | |
| 4,800,404 A * | 1/1989 | Ginsburg et al. ............ | 351/243 |
| 5,012,112 A * | 4/1991 | Flint et al. ............... | 250/493.1 |
| 5,070,239 A | 12/1991 | Pinkus | |
| 5,169,234 A | 12/1992 | Böhm | |
| 5,567,937 A | 10/1996 | Pinkus | |
| 5,592,247 A * | 1/1997 | Trokel ........................ | 351/239 |
| 5,679,949 A | 10/1997 | Task et al. | |
| 5,710,722 A | 1/1998 | Wood | |
| 5,717,608 A | 2/1998 | Jensen | |
| 6,194,701 B1 | 2/2001 | Task et al. | |
| 6,196,845 B1 | 3/2001 | Streid | |
| 6,414,305 B1 | 7/2002 | Bendall | |

OTHER PUBLICATIONS

A.R. Pinkus et al., "Night Vision-Weighted Irradiance Testing", U.S. Appl. No. 10/975,128, filed Oct. 20, 2004.

* cited by examiner

*Primary Examiner*—Isam Alsomiri
(74) *Attorney, Agent, or Firm*—AFMCLO/JAZ; Gerald B. Hollins (57) ABSTRACT

A cost considered arrangement for evaluating local illumination interference with operation of a night vision apparatus in for example the confines of an illumination inclusive aircraft cockpit. The evaluation is especially applicable to identifying interference between aircraft instrument lighting having infrared content for example, and night vision apparatus operation in the aircraft. The evaluation is cost is limited by use of a common household lamp night vision apparatus source calibrated with a common light measuring instrument operated at close range and with modification of the measured illumination through mathematical manipulation of the source operating distance to achieve the low light levels needed for night vision apparatus operation. A standard visual acuity chart and multiple operator interpretations of the chart resolutions achieved are included.

23 Claims, 4 Drawing Sheets

LOW COST NIGHT VISION APPARATUS AND COCKPIT LIGHTING COMPATIBILITY EVALUATION VIA VISUAL ACUITY

RIGHTS OF THE GOVERNMENT

The invention described herein may be manufactured and used by or for the Government of the United States for all governmental purposes without the payment of any royalty.

BACKGROUND OF THE INVENTION

Cockpit lighting can interfere with the optimum operation of night vision apparatus such as a night vision goggle, in several specific ways. For each interference mechanism, the effect on the image seen through the night vision apparatus is to reduce the light level or contrast of the useful image (the view from outside the aircraft). This reduction in light level or contrast can be manifested as a reduction in visual acuity and/or as an observed loss of contrast or brightness. In order to determine if a particular configuration of cockpit lighting or instrument illumination interferes with the proper operation of night vision apparatus the arrangement of the present invention can be used to implement a night vision apparatus visual performance assessment procedure such as is described in APPENDIX C of the present document. Although visual evaluation of night vision apparatus output by a human operator is most readily accomplished other night vision apparatus output evaluation apparatus may be used within the scope of the present invention.

Figure 5:
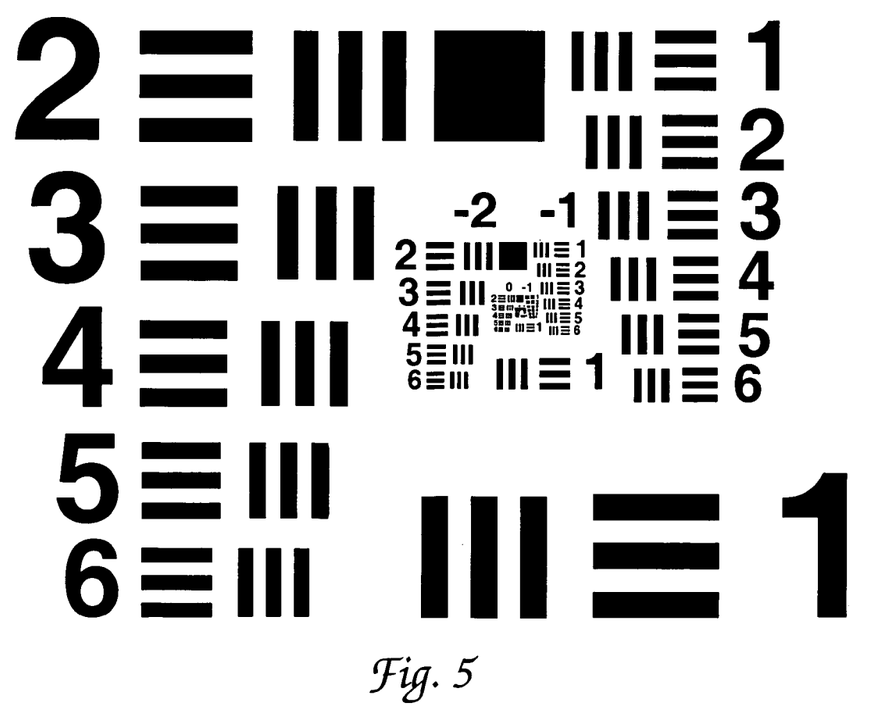
FIG. 5 shows details of a visual acuity resolution chart usable in the FIG. 1 night vision apparatus performance degradation detection system.

Currently, United States military personnel use the U.S. Air Force Resolution Chart shown FIG. 5 herein when performance evaluating or adjusting night vision apparatus. This resolution chart is now a standard for use by U.S. and allied military units performing night vision apparatus missions. This chart has a series of increasingly finer pairs of black and white bars, bars that, when viewed through night vision apparatus, allow maintenance personnel to evaluate and adjust the viewed image quality and allow the war fighter to personally perform night vision adjustments such as objective lens focusing, interpupillary distance selection, tilt angle adjustment, eyepiece selection and battery checking prior to a night vision mission. The resolution chart of U.S. Pat. No. 4,607,923, issued to Task et al. in 1986 and other resolution charts as described later herein may also be used for these purposes.

Use of such resolution chart for the present night vision apparatus visual performance assessment or other purposes however requires it to be precisely irradiated at low light levels, levels on the order of 0.0025 foot-lamberts for example. Such irradiance levels afford almost no human vision capability. This chart usage irradiance is often accomplished with the aid of an irradiance-measuring instrument such as a photometer or a radiometer or the low level instrument described in the U.S. Pat. No. 7,235,779. Photometer and radiometer instruments however range in value from $5,000 to $28,000 or greater as may be observed in the catalog or on the web site of one supplier of such instruments, Hoffman Engineering Corporation of Stamford, Conn., http://www.hoffmanengineering.com. Such instruments are also generally unsuited for use under field conditions as is dictated by their cost and their substantially fragile nature.

The present invention is believed to provide an answer for these difficulties in addition to providing night vision apparatus visual performance assessment.

The U.S. Pat. No. 4,607,923, U.S. Pat. No. 7,235,779 and each other patent document and reference document identified herein are also hereby incorporated by reference herein.

SUMMARY OF THE INVENTION

The present invention provides low cost evaluation of night vision system performance degradation by interfering local illumination.

It is therefore an object of the invention to evaluate night vision system performance degradation under conditions often found in the cockpit of an aircraft.

It is another object of the invention to provide night vision system performance degradation evaluation in an economically achieved manner It is another object of the invention to provide known night vision apparatus-compatible irradiance level conditions in an economic manner.

It is an object of the invention to provide night vision performance degradation detection system adapted to successful usage by unskilled personnel.

It is an object of the invention to provide a night vision performance degradation detection system compatible with existing night vision apparatus resolution measurement procedures.

It is an object of the invention to provide a night vision apparatus performance degradation detection system capable of both convenient field use and replacement of more costly laboratory equipment.

It is an object of the invention to provide a night vision apparatus performance degradation detection system that is suitable for use in most aircraft types, i.e., in small and large, military and other aircraft, wherever night vision apparatus is used.

It is an object of the invention to provide a night vision apparatus performance degradation detection system that may be embodied in the form of a low cost kit for degradation testing.

It is an object of the invention to provide a night vision apparatus performance degradation detection system that is suitable for use in vehicles other than aircraft and in non vehicular situations where night vision apparatus operates in the presence of competing local illumination.

It is an object of the invention to clarify the constant relationship between human based illumination levels and night vision apparatus related irradiance levels involving a fixed source color temperature.

It is an object of the invention to generate the correct irradiance on an acuity chart to enable conduction of night vision apparatus lighting compatibility tests.

These and other objects of the invention will become apparent as the description of the representative embodiments proceeds.

These and other objects of the invention are achieved by the economical method of testing for aircraft cockpit illumination interference with adjacent night vision apparatus performance; said method comprising the steps of:

selecting an illumination source inclusive of a small wattage incandescent lamp of known blackbody radiation distribution and color temperature operating characteristics and a pinhole aperture element for illuminating a test target to be viewed by said night vision apparatus;

measuring an output from said illumination source at a known small first separation distance and using off-the-shelf first input level-capable illumination measuring instrumentation;

locating a test target to be viewed by said night vision apparatus at a greater second separation distance from said illumination source and within view of a crew station location of said aircraft cockpit;

said greater second separation distance from said illumination source generating a lesser second level illumination of said test target by said source, an illumination level below resolution capability of said illumination measuring instrumentation but within input operating range of said night vision apparatus;

said greater second separation distance from said illumination source being determined from said small first separation distance measured output of said illumination source, by an inverse square law mathematical relationship between said first and second measured distances and said input operating range of said night vision apparatus; and comparing night vision apparatus viewed images of said test target with said aircraft cockpit illumination energized and de-energized to identify cockpit illumination sourced degradations incurred therein.

BRIEF DESCRIPTION OF THE DRAWINGS

The accompanying drawings incorporated in and forming a part of the specification, illustrate several aspects of the present invention and together with the description serve to explain the principles of the invention. In the drawings.

DETAILED DESCRIPTION OF THE INVENTION

Figure 1:
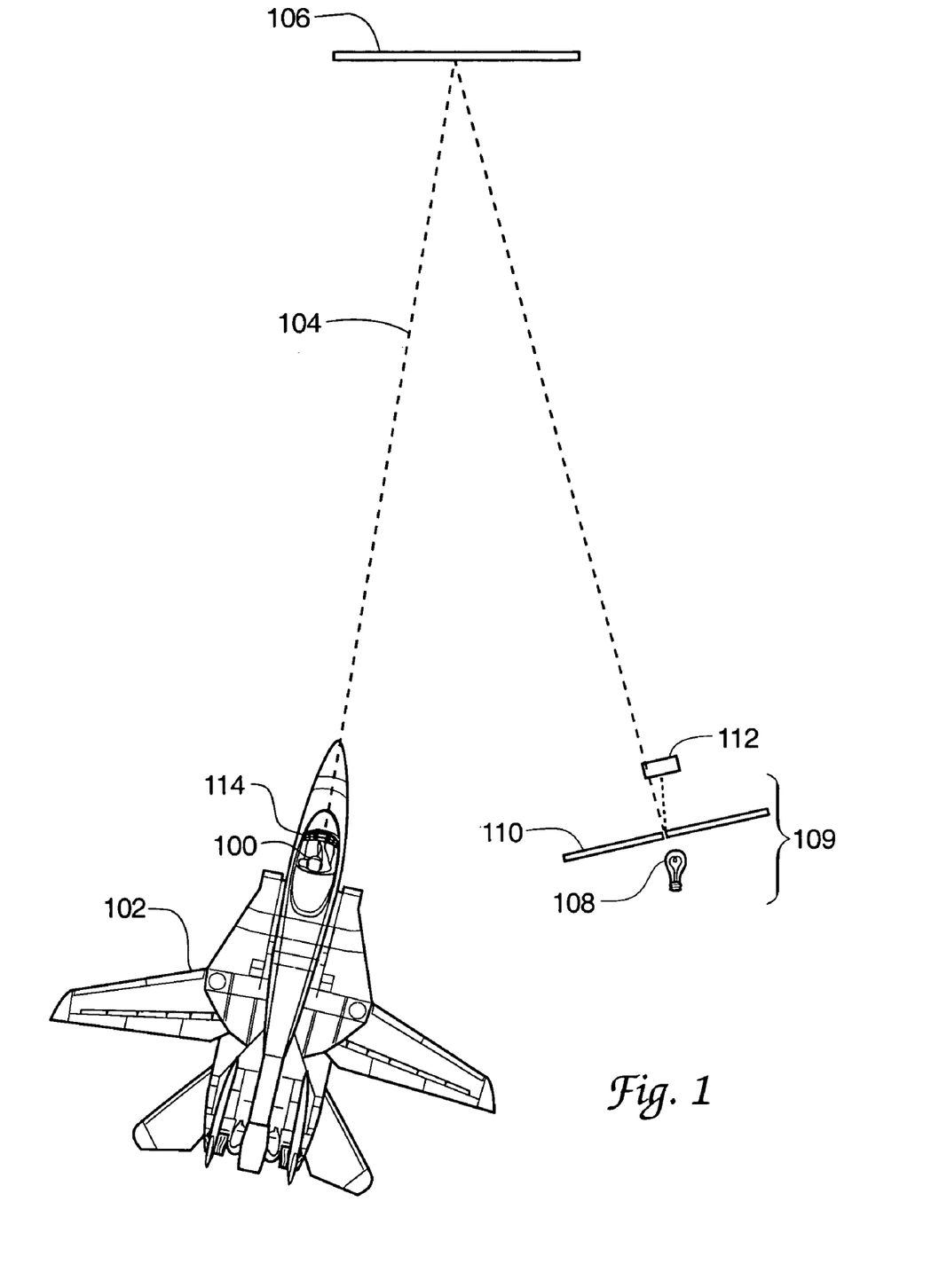
FIG. 1 shows a simplified perspective diagram of a night vision apparatus performance degradation detection system according to the present invention and its calibration.

FIG. 1 in the drawings shows a simplified perspective view diagram of a night vision apparatus performance degradation detection system according to the present invention. The FIG. 1 drawing also includes an arrangement for calibration of the FIG. 1 performance degradation detection system. In FIG. 1 the resolution chart of FIG. 5 for example is represented at 106 and is being used as the viewed object in the night vision apparatus performance degradation detection system. Chart 106 is oriented nominally perpendicular to the viewing path 104 of FIG. 1. The FIG. 1 resolution chart or visual acuity measurement chart 106 displays a representative series of square-wave generating patterns (i.e., alternating black and white lines) of low to high spatial frequency (i.e., from coarse to fine line sizes and spacing as are represented in the Group-4 to Group-1 patterns in the drawing.

The patterns of the FIG. 1 chart 106 allow an observer 100 to make changes to the several adjustment controls of a night vision apparatus operated within the aircraft 102 and, most importantly for the present invention, to evaluate the degree to which cockpit light interference, from illumination in for example the instrument panel 114, interferes with this night vision apparatus. After performing night vision apparatus adjustments, the highest observable pattern, the finest of the gratings in FIG. 5, is then an indication of the night vision apparatus' ability to resolve fine detail. The performed adjustments may achieve as much as 20/30 Snellen acuity or a 1.5 minutes of arc degree of resolution capability in a night vision apparatus, for example. Night vision apparatus performance problems such as interference based loss of resolution or less than optimum focusing are usually discernible during one or more tests performed in the FIG. 1 manner.

Typically the FIG. 1 chart 106 is dimly irradiated by an incandescent lamp(s) comprising a source 109 in the FIG. 1 drawing. To an average person such illumination in fact might well be described as being of "Ultra low level" intensity; almost nothing is visible even after a dark adaptation period. The U.S. Army and other users for example employ a standard lamp of 2856 degrees Kelvin color temperature for the irradiation source 109. Such a source of known color temperature is needed for performing the FIG. 1 test because night vision apparatus is inherently wavelength sensitive, i.e., is expressly arranged to be responsive to a specific band of input wavelengths, such as 665 to 930 nanometers, while largely rejecting wavelengths outside of this band. A shift of input energy toward or away from his band of wavelengths thus has a direct effect on night vision apparatus performance. Additional details regarding night vision devices and apparatus used in evaluating their performance are disclosed in U.S. Pat. No. 7,235,779 titled "NIGHT VISION-WEIGHTED IRRADIANCE TESTING", an application filed on Oct. 20, 2004 in our names along with the name of a colleague. The contents of this copending application are hereby incorporated by reference herein.

The present invention is concerned with night vision apparatus performance degradation resulting from local light interference. In the present invention this interference is evaluated by way of one or more observers (preferably several observers accomplishing several evaluations each) viewing the chart 106 along a path 104 or similar paths from within an aircraft under test 102 while the chart 106 is dimly illuminated and within the operating range of the night vision apparatus. Achieving this dimly illuminated yet accurately known state of illumination of chart 106 is in fact a significant aspect of the invention as will become apparent in the following discussion.

For present cost considered evaluation of night vision apparatus performance degradation it has been found possible to achieve the FIG. 1 illumination source 109 in a somewhat unusual manner, a manner standing in contrast with conventional use of a photometer or a radiometer laboratory instrument having appropriate low level light sensitivity for use in the night vision apparatus environment. The apparatus used herein in achieving source 109 generally includes the lamp 108 and the pinhole aperture 110 represented in the FIG. 1 drawing along with a conventional illumination measuring instrument, represented at 112, that is capable only of measuring illumination levels above those needed on the chart 106 for night vision apparatus performance degradation detection. Functionality of the present invention is based at least in part on a recognition that relatively easily measured photometric units such as "foot-candles" or "Lux" can be converted to night vision apparatus radiometric units when the color temperature and the night vision apparatus spectral sensitivity is known.

The elements used in the present invention are in fact contemplated to be the contents of a night vision apparatus performance degradation detection system package or kit that is sufficiently low in cost as to be made available to Federal Aviation Administration and other government agency users for application to a large range of aircraft and night vision usage situations. Details concerning these elements may be understood from the following methodology for creating a "calibrated" night vision apparatus irradiance light source for conduction of night vision apparatus compatibility tests and additional information disclosed below herein.

Methodology

Problem to be solved: Identify an inexpensive way to generate the correct irradiance on an acuity chart to conduct night vision apparatus lighting compatibility tests.

Approach: For a specific black body radiation distribution, defined by a color temperature, the relationship between illuminance (visible light) and night vision apparatus sensitive irradiance is a fixed constant. The value of the constant depends on the color temperature of the incandescent light source.

Color temperature varies with lamp voltage.

If the illuminance (foot-candles or lux, depending on the system of units used) that corresponds to the correct night vision apparatus irradiance is known then the illuminance of the source can be measured at some known distance and the night vision apparatus irradiance at that distance is known.

Figure 7:
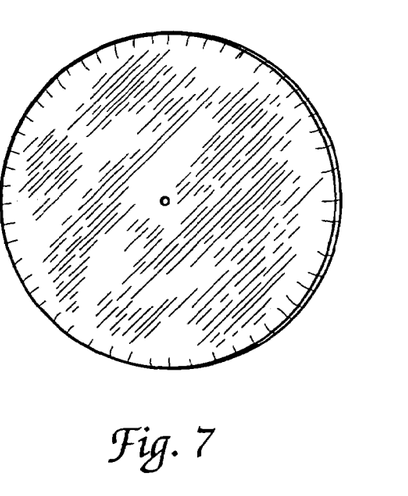
FIG. 7 shows a pinhole aperture element usable in the FIG. 1 night vision apparatus performance degradation detection system.

If the night vision apparatus irradiance at a specified distance is known then, if the light source can be considered a point source, the irradiance at other distances can be calculated. A pinhole baffle as shown in FIG. 7 herein is used to approach this point source arrangement Conversely, if a specific night vision apparatus irradiance is required the distance from source to chart can be adjusted to achieve the desired irradiance using the inverse square law.

Performance Steps:

Determine proportionality constant between illuminance and night vision apparatus irradiance for the color temperature lamp used. This constant is not expressly used in the ensuing steps, nevertheless it is helpful to recognize its existence. The constant is additionally considered elsewhere herein.

Measure the illuminance produced by the lamp at a known, and fairly close, distance so that an inexpensive illuminance meter has sufficient sensitivity to make a reasonably accurate measurement.

Calculate how much the illuminance must be reduced such that one has the correct illuminance that corresponds to the desired night vision apparatus irradiance.

Use the inverse square law to determine how much further away the lamp and chart must be in order to achieve the illuminance that corresponds to the desired night vision apparatus irradiance.

It is helpful to recognize in these steps that "illuminance" relates to light sensed by the human eye and its spectrum while "irradiance" relates to electromagnetic energy and its spectrum as sensed by a night vision apparatus. The relationship of these two spectrums is considered in connection with FIG. 2 and FIG. 3 herein.

Discussion: The technique for determining whether or not an aircraft compartment lighting system is night vision apparatus compatible using visual acuity degradation as the critical metric is described in Military Specification Mil-L-85762A and other documents including the procedure included below herein. A significant part of the evaluation is to insure the visual acuity chart is illuminated to a proper, calibrated level prior to applying the evaluation procedure. A significant part of this invention is thus the method devised to insure the chart is illuminated with electromagnetic (E-M) energy that the night vision apparatus is sensitive-to; an appropriate, reasonably calibrated level without the use of expensive radiometric or spectroradiometric measurement equipment.

Figure 2:
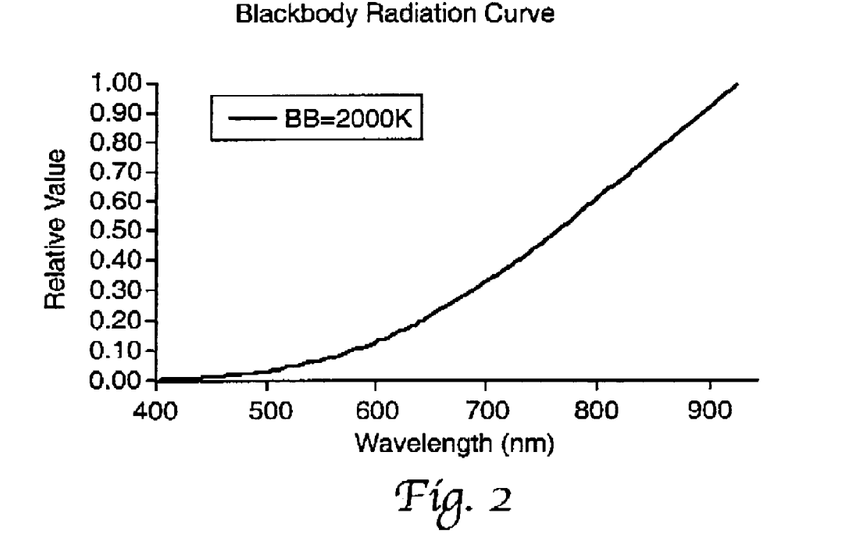
FIG. 2 shows the spectral distribution of a blackbody radiator, an incandescent light source, operating at 2000 K.
Figure 3:
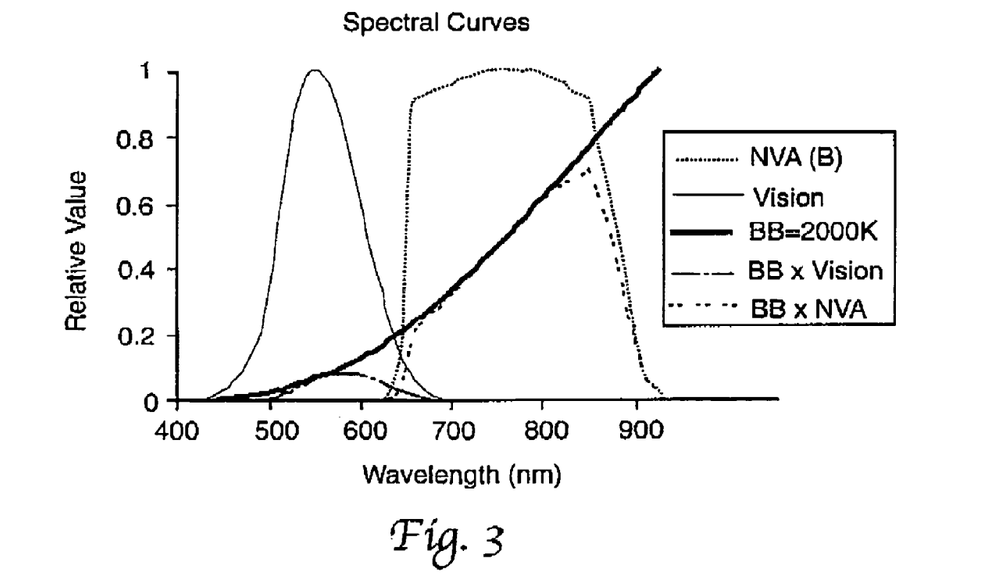
FIG. 3 shows a multiplication of human eye and night vision apparatus sensitivities with the FIG. 2 spectral distribution.
Figure 6:
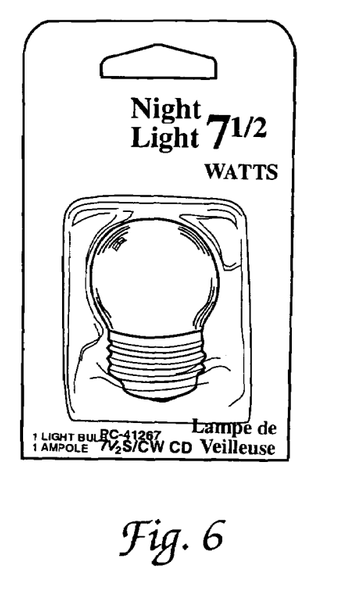
FIG. 6 shows an incandescent lamp element usable in the FIG. 1 night vision apparatus performance degradation detection system.

An illuminator for the visual acuity chart may be as simple as an incandescent light source (e.g. a 7½ watt, frosted household lamp energized from 120 volt alternating current energy as appears in the FIG. 6 drawing herein) when appropriate provisions are made. The spectral distribution of the energy emitted by such an incandescent light source, basically a blackbody radiator, depends on its color temperature or operating temperature. FIG. 2 herein shows an example of the spectral distribution of such an incandescent light source operating at a color temperature of 2000 K.

The human eye is sensitive to spectral energy from about 400 nanometers to about 700 nanometers of wavelength, however, it is not uniformly sensitive across this wavelength range. The curve that describes the sensitivity of the human eye to the different wavelengths of light is called the visual efficacy curve, which will be referred-to herein as simply the vision curve. This vision curve is the basis for photometric measurements in that measuring devices are designed to have the same spectral sensitivity as the human eye. The amount of the 2000 K incandescent light source energy that the eye can see is proportional to the area under the curve obtained by multiplying the human visual curve times the blackbody radiation curve. In a similar fashion, the amount of energy that a night vision goggle can "see" is proportional to the area under the curve obtained by multiplying the NVG sensitivity curve times the light source curve. The FIG. 3 drawing shows an example of these curves.

A significant aspect of the present invention is that the ratio of the BB x Vision and BB xNVA (night vision apparatus) curves remains constant no matter how much energy is emitted by the FIG. 1 and FIG. 6 lamps so long as the lamp filament operating temperature remains constant (in this case, at 2000 K). This can be expressed in mathematical equation form as:

$$VIS = K \times NVA$$

Where:

VIS=Vision weighted units from photometry (such as luminance or illuminance)

NVA=night vision apparatus weighted radiometric units (such as radiance or irradiance)

K=a constant converting the night vision apparatus radiometric units to vision-based photometry units. (For example, K might have the units of foot-Lamberts/(watts/cm$^2$-steradian)

Note that the same technique of calculating the area under the two curves indicated in FIG. 2 can be accomplished no matter what type of unit is being used for the blackbody spectral energy distribution. This unit could be in radiance units, irradiance units, or simply power (watts). The point is that there will be a constant relationship between the night vision apparatus visible units and the vision-based units that can be used to convert from one to the other so long as the color temperature of the blackbody radiator does not change.

A common criterion for a night vision apparatus evaluation method is to illuminate the chart viewed by the night vision apparatus to a night vision apparatus-weighted radiance of $1.6 \times 10^{-10}$ watts/cm$^2$-str. Using the area under the curve method described in FIG. 2 one can calculate the luminance (and proportionality constant) that corresponds to this night vision apparatus-weighted radiance. Using the spectral sensitivity curve for the Class B night vision apparatus and a 2000 K blackbody radiator one obtains a luminance of approximately 0.000025 foot-Lamberts (after using standard photometric equations to convert from radiance to luminance) that corresponds to the required radiance.

The illuminance required to produce 0.000025 foot-Lamberts is 0.000025 lumens/ft$^2$. This illuminance is equal to 0.000269 lux (lumens/m$^2$) if the vision target is a perfect Lambertian (diffuse white) reflector. This is, however, a fairly small illuminance value for an inexpensive illuminance meter to measure. In consideration of this difficulty the present invention includes an accommodation in the form of a mathematical computation in which the inverse square law is used to make measurements of illuminance closer to the source in order to provide the correct, required illuminance at the night vision apparatus target.

If the nominal distance from the light source to the vision target is 20 feet for example and the illumination is measured at a distance of one foot for measuring convenience then, using the inverse square law, this means the illuminance at the target will be $\frac{1}{400}$ of the illuminance measure at one foot. Use of this short distance for measuring convenience is represented by the location of the measuring instrument 112 with respect to the source 109 in the FIG. 1 drawing. A more detailed showing using such a close measurement appears in the FIG. 4 drawing herein.

Using this factor of 400 we get an illuminance of 0.107 lux to be measured in the above example. This number is now within the reasonable range of an inexpensive illuminance meter that can measure down to the nearest 0.01 lux. Such an instrument is shown in the FIG. 8 drawing herein.

If a higher color temperature is used for the source 109 in FIG. 1, such as a temperature of 2200 K rather than 2000 K, then the illuminance required to achieve the necessary night vision apparatus radiance will be higher. At 2200 K the corresponding luminance would be 0.0000335 foot-Lamberts and the illuminance required would be 0.0000335 lumens/ft$^2$ or 0.000377 lux. Using the 20 ft distance, inverse square law relationship this means one would need an illuminance at one foot of 400×0.000377 or about 0.15 lux. If the actual illuminance measured at the one foot distance is too high or too low then the nominal 20 ft distance for separation of the chart 106 and the source 109 in FIG. 1 may be adjusted, using the inverse square law, to obtain the illuminance at the vision chart that corresponds to the desired night vision apparatus radiance. This practice is used in the present invention as is described in the test procedure below especially in connection with the Table 1 described separation distances.

This test procedure ensures the FIG. 1 chart 106 receives the desired night vision apparatus irradiance within a reasonable margin of error given the inexpensive measuring and radiance generating arrangements described. However, the color temperature of the source needs to be known to a reasonable degree of accuracy since this affects the value of the constant relating the vision-based photometric units to the desired NVG-based radiometric units in the manner described in connection with the 2200 K temperature. Maintenance of an established constant lamp color temperature over at least short time intervals can be accomplished of course by way of controlling source lamp filament operating voltage and current levels and lamp replacement when operating current levels begin to diminish.

With an understanding of how the night vision apparatus acuity measurement chart 106 in FIG. 1 may be precisely illuminated for night vision apparatus performance degradation detection purposes, it is possible to consider a detailed procedure for making a degradation detection measurement. The following list of specific instructions discloses such a procedure.

Test Procedure

The following procedure may be used to determine a cockpit lighting system is compatible with night vision apparatus.

STEP 1. Verify that the night vision apparatus being used meets the minimum visual acuity requirements at specified light levels. Consult the normal adjustment and verification steps for the night vision apparatus involved.

STEP 2. Verify that the test facility is dark enough to perform the night vision apparatus cockpit lighting compatibility evaluation by conducting the following test:

a. Within the darkened test facility, position the mounted visual acuity chart, such as the FIG. 5 USAF 1951 tri-bar chart, 20 feet from the objective lens of the night vision apparatus and illuminate the chart with sufficient light to make it easily visible through the night vision apparatus (use any convenient light source for this step). Other visual acuity charts, even an optician's Snellen chart of for example the rotated E type, can be used for this purpose with appropriate calibration.
  b. Focus the eyepiece and objective lenses of the night vision apparatus while viewing the tri-bar chart with the night vision apparatus.
  c. Once focus is achieved turn off ALL of the lights in the testing facility.
  d. Dark-adapt for 5 minutes
  e. With the lights off, read the tri-bar chart and determine the smallest group and element of tri-bars (operator must see BOTH the vertical and the horizontal chart lines) that can be resolved, if any.
  f. If the operator is unable to resolve a group and element smaller than the FIG. 5 chart Group-4, Element 1 in the correct orientation, then the facility is sufficiently dark to conduct the lighting evaluation.
  g. If it is determined that the testing facility is not dark enough for the evaluation, recess the tri-bar chart in a box enclosure to shade it from ambient illumination and re-check to insure that the sufficiently dark criterion stated above is met.

STEP 3. Procedure for Setting the Distance from the Target to the Illuminator

To insure the correct irradiance level after the "sufficiently dark" criterion has been met, set the distance from the tri-bar chart to the illuminator according to the following steps.

Figure 4:
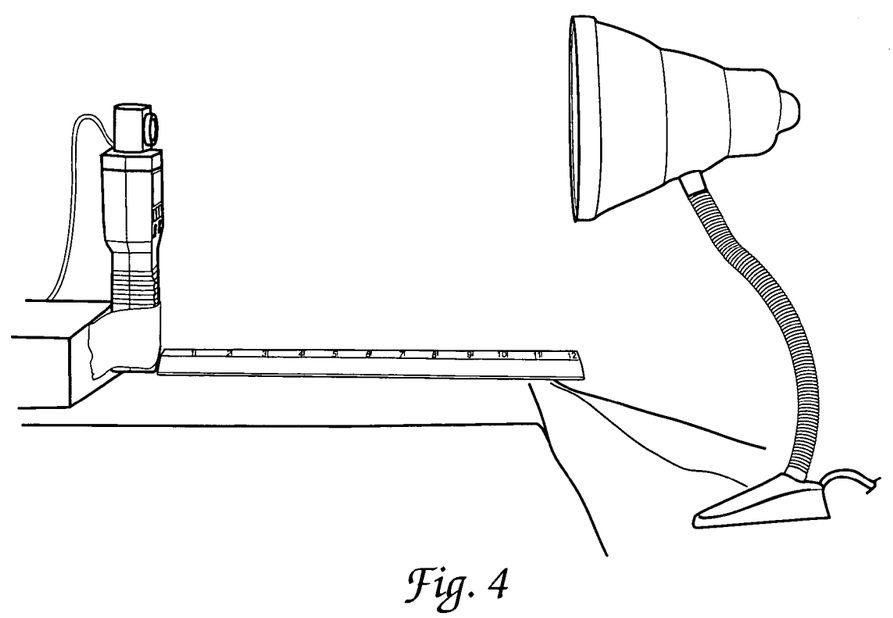
FIG. 4 shows additional illumination calibration details of the FIG. 1 night vision apparatus performance degradation detection system.

Position the light sensor of the illuminance meter (for example an Extech 403125 Light Probe Meter) 12.0 inches from the front of the baffle of the light source as shown in FIG. 4 herein. Note: This distance is critical, maintain the best accuracy possible.

Figure 8:
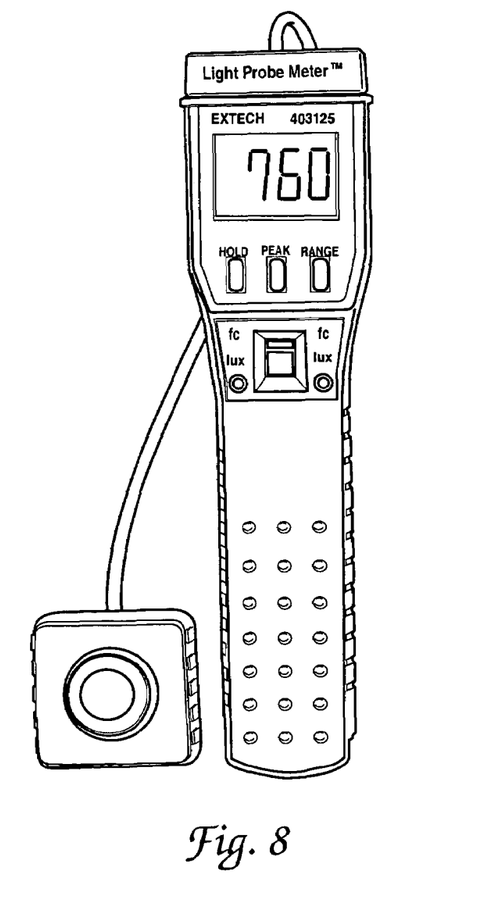
FIG. 8 shows an illumination measuring instrument usable in the FIG. 1 night vision apparatus performance degradation detection system.

FIG. 8 herein shows an Extech 403125 instrument, additional information is available at http:www.extech.com or from the manufacturer in Waltham, Mass.

Set the light sensor to the "lux" position and record the reading.

Locate the lux value in the first column of the below Distance Look-up Table 1. The distance from the target to the light source should be set to the distance determined by the look-up chart for the corresponding lux value. This step of course establishes the chart illumination level as is described above herein. Table 1 values may be computed using the inverse square law mathematical relationship described above.

Position the light source the indicated distance from the chart and the chart a nominal 20 foot distance from the objective lens of the night vision apparatus and insure that the target is centered in the illuminated area.

TABLE 1

Distance Look-Up Table

| Lux @ 12 in | DISTANCE Decimal (ft) | Feet | Inches |
|---|---|---|---|
| 0.08 | 14.48 | 14 | 5¾ |
| 0.09 | 15.35 | 15 | 4¼ |
| 0.10 | 16.18 | 16 | 2¼ |
| 0.11 | 16.97 | 16 | 11¾ |
| 0.12 | 17.73 | 17 | 8¾ |
| 0.13 | 18.45 | 18 | 5½ |
| 0.14 | 19.15 | 19 | 1¾ |
| 0.15 | 19.82 | 19 | 9¾ |
| 0.16 | 20.47 | 20 | 5¾ |
| 0.17 | 21.10 | 21 | 1¼ |
| 0.18 | 21.71 | 21 | 8½ |
| 0.19 | 22.31 | 22 | 3¾ |
| 0.20 | 22.89 | 22 | 10¾ |
| 0.21 | 23.45 | 23 | 5½ |
| 0.22 | 24.01 | 24 | 0 |
| 0.23 | 24.55 | 24 | 6½ |
| 0.24 | 25.07 | 25 | ¾ |
| 0.25 | 25.59 | 25 | 7 |
| 0.26 | 26.10 | 26 | 1¼ |

STEP 4. Obtain Baseline Visual Acuity

While the observer is sitting in the aircraft cockpit with the objective lens of the night vision apparatus located 20 feet from the chart (with chart illuminator turned ON), turn OFF the cockpit lighting. Determine the observer's visual acuity by having the observer identify the smallest Group and Element number of the chart that is resolvable. The observer MUST resolve BOTH the vertical and the horizontal bars in the element. Record the related Snellen acuity, as is determined by converting the angular subtense of the resolved target in minutes of arc to Snellen units as in Table A-1 herein presented. Snellen acuity is based on the notion that normal vision corresponds to the ability to resolve a target that subtends 1 minute of arc. This value is set at "20/20" which means that the person can see at 20 feet (the first number 20) what a normal person can see at 20 feet (the second number 20). If one can only resolve a target of 2 minutes of arc then his/her visual acuity would be "20/40" which means this person can see at 20 feet (the top number) what a normal person can see at 40 feet (the bottom number). A resolution of 3 minutes of arc corresponds to a Snellen Acuity of 20/60 and so on. The bottom number is determined by multiplying the minutes of arc resolved times 20.

STEP 5. Obtain Test Visual Acuity

Turn the cockpit lighting ON and determine the observer's visual acuity by having her/him identify the smallest Group and Element number on the chart that is resolvable. Again, the observer MUST resolve BOTH the vertical and the horizontal bars in the element. Record the related Snellen acuity.

STEP 6. Assessment

If there is no decrement in visual acuity between Steps 4 and 5 (cockpit lighting OFF vs ON), then the lighting system is night vision apparatus compatible.

STEP 7. Additional Locations

Repeat steps 4 through 6 for different plausible observer locations and view angles through the windscreen/canopy as necessary.

STEP 8. Correction of Identified Interfering Light Sources

If there is a decrement in visual acuity between steps 4 and 5, locate the source(s) of the offending lights in the cockpit and correct their deficiency. After the deficiency has been corrected, again determine any loss of visual acuity from cockpit lights OFF to ON.

STEP 9. Windscreen/Canopy Reflections

If reflections of cockpit instruments/displays are visible in the windscreen/canopy, move the tri-bar chart and illuminator until the observer is looking through the reflections with the night vision apparatus. Again, determine if there is a loss of visual acuity with the cockpit lights ON compared to OFF.

While the apparatus and method herein described constitute a preferred embodiment of the invention, it is to be understood that the invention is not limited to this precise form of apparatus or method and that changes may be made therein without departing from the scope of the invention as is defined in the appended claims.

APPENDIX A

Fabrication of Visual Acuity Chart

Group-4 Group-3

Source of Tri-Bar Chart: A USAF 1951 Tri-bar chart is shown in the FIG. 5 drawing herein. This chart has origin during the year 1951 in connection with aerial photography resolution work. When printed in normal size, Group 0 and element 1 of this chart occupy a space of one millimeter for a black and white cycle. Alternately this measure may be appreciated as recited in the following step.

Printer Recommendations: Using a Laser printer, print the chart such that Group-4, Element 1 measures 40 mm×40 mm (the size of the square defined by the 3 dark and 2 light bars).

Paper Recommendations: HP Office Recycled Paper, 8.5"×11", 87 brightness, 20 lb weight or equivalent is recommended for printing these charts.

Procedure for Mounting Chart to a Foam-Core Backing:

Use a can of 3M spray adhesive to mount the printed chart to a piece of foam-core.

When dry, trim the foam-core to the size of the paper

Explanation and Key for Converting Tri-Bars to Visual Acuity

Night vision apparatus-aided visual acuity data may be obtained using this USAF 1951 Resolution Resolving Power Target (tri-bar) chart. The chart consists of a large number of target elements, encompassing a wide range of sizes, divided into groups of six. The elements progressively increase in size (decreasing in spatial frequency) at relative intervals of $$\sqrt[6]{2}$$

(approximately 12%). Each element contains two patterns, each composed of three dark lines and separating white spaces, all of equal width; one pattern is horizontal and the other vertical. Each group is identified by a different number, while the elements in each group are numbered 1 through 6. For a given viewing distance, the group/pattern numbers correspond to known Snellen visual acuity values (i.e. 20/20, 20/25, 20/45, etc.).

TABLE A-1

Conversion of Tri-Bars to Visual Acuity
at a 20 Foot Distance (20/XX)

| GROUP | ELEMENT | VISUAL ACUITY |
|---|---|---|
| −4 | 1 | 90.3 |
| −4 | 2 | 80.4 |
| −4 | 3 | 71.7 |
| −4 | 4 | 63.8 |
| −4 | 5 | 56.9 |
| −4 | 6 | 50.7 |
| −3 | 1 | 45.1 |
| −3 | 2 | 40.2 |
| −3 | 3 | 35.8 |
| −3 | 4 | 31.9 |
| −3 | 5 | 28.4 |
| −3 | 6 | 25.3 |
| −2 | 1 | 22.6 |
| −2 | 2 | 20.1 |
| −2 | 3 | 17.9 |
| −2 | 4 | 16.0 |
| −2 | 5 | 14.2 |
| −2 | 6 | 12.7 |
| −1 | 1 | 11.3 |
| −1 | 2 | 10.1 |
| −1 | 3 | 9.0 |
| −1 | 4 | 8.0 |
| −1 | 5 | 7.1 |
| −1 | 6 | 6.3 |

Recommended Directions to Evaluators:
  Place the chart 20 feet from the objective lenses of the night vision apparatus used by the observer seated in the cockpit of the present invention aircraft.
  Ask the observer to determine the smallest group and element of tri-bars (observer must resolve BOTH the vertical and the horizontal lines) that can be resolved.

APPENDIX B

Visual Acuity Chart Illuminator Fabrication and Use

DESCRIPTION

Equivalent Components and Test Equipment may be Used.

Light Source Components

| | |
|---|---|
| Mainstays Decor Gooseneck Metal Clip On Lamp Walmart (004766912088) (See FIG. 4 herein) | $7.97 |
| GE Night Light, 7.5 watt (7 1/2S/CW CD, PC: 41267) (See FIG. B-1) | $2.63 |
| 6" Round Damper Baffle Lowe's (36431) (See FIG. 6 herein) | $1.83 |

Equipment Needed for FIG. 7 Baffle/Pinhole Element Fabrication

Electric drill

1/8" drill bit

Hammer

Common Nail

No. 2 lead pencil

Small flat file

Ruler with 32$^{nd}$ inch divisions

Can of flat black spray paint

Roll of black tape

Fabrication Instructions
  Unpackage all equipment.
  Insert 7.5 W bulb into the lamp and check for operation.
  Remove the mounting screws on the sides of the damper baffle by drilling out the rivets on the mounting bracket screws with a electric drill and 1/8" bit.
  Locate the center of the 6" baffle with a ruler.
  Mark the center with a pencil.
  Make a punch mark in the center of the baffle using hammer and nail.
  Using the electric drill and 1/8" drill bit, drill a hole in the center of the damper baffle.
  Use the metal file to remove sharp metal edges of the drilled hole.
  Paint the baffle on both sides with flat black spray paint.
  Use black tape to cover the holes in the lamp housing to prevent light leaks.
  Center the baffle over the open bell of the lamp housing.
  Use black tape to secure the baffle over the bell of the lamp housing.

Illuminance Meter

Extech Light ProbeMeter (403125) (See FIG. 8 herein) $119.00

Extech Instruments

285 Bear Hill Road

Waltham, Mass. 02451-1064

Phone: 781-890-7440

Fax: 781-890-7864

Website: http://www.extech.com

APPENDIX C

Excerpts from SC-196 RTCA/DO-275 MOPS for NVIS Equipment 4.4.1.3.4.3 NVG-Aided Visual Acuity Evaluation
  Night vision apparatus-aided aircraft visual acuity (VA) measurements are obtained with the evaluator or operator seated in the aircraft cockpit and with the cockpit lighting adjusted to an operationally representative level. No detectable degradation in VA due to the cockpit lighting should be observed. If degradation exists, the incompatible light source(s) should be identified. The night vision apparatus used during the evaluation should be representative of that planned for use in the aircraft. If the night vision apparatus intended for operational use have fixed focus objective lenses, then for the purpose of this evaluation night vision apparatus having variable focus objective lenses and overall performance (e.g., resolution, gain) otherwise equivalent to the fixed focus night vision apparatus should be employed. The assessment must be conducted in a facility where the illumination level can be easily controlled.
  NVG-aided VA measurements may be obtained using a USAF 1951 Medium (or High) Contrast Resolution Resolving Power Target (USAF Tri-bar Chart) or equivalent sine or square wave grating bar chart. The chart consists of a large number of target elements, encompassing a wide range of sizes, divided into groups of six. The elements progressively decrease in size (increasing in spatial frequency) at relative intervals of approximately 12%. Each element contains two patterns, each composed of three dark lines and separating white spaces all of equal width; one pattern is horizontal and the other vertical. Each group is identified by a different number, while the elements in each group are numbered 1 through 6. For a given viewing distance, the group/pattern numbers correspond to Snellen visual acuity values varying at fixed intervals of approximately 12%.

At least two experienced evaluators should be used for present evaluations. The chart is placed twenty feet from the objective lens of the night vision apparatus used by the evaluator seated in the cockpit. If it is not possible to locate the chart at twenty feet (e.g., multiplace aircraft with various eye positions), the chart is placed at a position where it can be viewed while seated at all crew stations (mathematical adjustments can be made for the varied distances). More than one chart may be used if measurements are to be taken through different transparencies (e.g., windscreen, windows, canopy, etc.), through transparency reflections, or for other purposes. The illumination level on the chart should be adjusted so that night vision apparatus radiance measured from the white portion of the target is equivalent to $1.6 \times 10^{-10}$ $NR_B$.

Prior to the assessment of night vision apparatus-aided VA, the evaluators adjust the night vision apparatus to obtain maximum VA for the distance to the chart(s). If charts are located at different distances, it may be necessary to make small adjustments of the night vision apparatus objective lens focus for each chart. If the night vision apparatus has a diopter adjustment, care should be taken not to readjust the diopter setting when making these small adjustments for distance. While measurement conditions will be specific to the aircraft type, test procedures are usually performed in the following order:

1. Unobstructed (over or around all transparencies)
2. Baseline condition: View the chart through the appropriate transparency with all cockpit lighting extinguished, and note the smallest discernable element. Some aircraft transparencies may block near-IR energy, thus reducing the amount of energy to which the night vision apparatus is most sensitive. Any loss of VA noted when going from the Unobstructed Condition to the Baseline Condition is a result of this effect. In this event, the loss of night vision apparatus-aided VA should be assessed for potential adverse effects on flight operations. The night vision apparatus-aided VA noted during the Baseline Condition will be the comparison point for determining if the modified lighting has an adverse effect on night vision apparatus performance.
3. Trial condition 1: View the chart through the appropriate transparency with the cockpit lighting at an operational brightness level and note the smallest discernable element
4. Trial condition 2: View the chart through the appropriate aircraft transparency with the cockpit lighting at an operational brightness level and all warning, caution and advisory lights illuminated, and note the smallest discernable element.
5. If any VA degradation is noted between the Baseline Condition and either of the Trial Conditions, then additional measurements should be made with individual lighting components or combinations of components illuminated to identify the offending source(s).
6. Using the reflection information gathered during the nighttime readability assessment, view through adverse reflections with the night vision apparatus to determine the impact on night vision apparatus-aided VA. This may require the relocation of existing charts or the placement of additional charts. If a chart location is modified or if new charts are added, the viewing distance to the night vision apparatus should be measured. In addition to the reflections that are incompatible to the night vision apparatus, evaluate the impact of reflections on unaided viewing. This may be difficult to adequately assess given the testing conditions. In that case, further evaluations should be conducted during flight tests.

If the aircraft is equipped with a windshield anti-ice system, it should be evaluated to determine the impact on night vision apparatus use. Typically any problem will be distortion of the area being heated, which may cause some degradation of the outside scene when viewing through the affected area unaided or when using night vision apparatus. The resolution chart should be viewed through the affected area to determine if there is night vision apparatus-aided VA loss in addition to the distortion. The effects should also be evaluated during flight test to determine the impact to operations, and, if necessary, relevant procedures should be developed and incorporated into applicable aircraft manuals. CAUTION: When testing the anti-ice system, be sure to review operating limitations for the system. Damage to windshields can occur if the system is actuated inappropriately.

We claim:

1. The inexpensive, in-the-field method of verifying night vision apparatus isolation from competing local illumination, said method comprising the steps of:
    training said night vision apparatus on a remotely located standard visual acuity chart;
    illuminating said visual acuity chart from a distant household incandescent lamp point source night vision apparatus compatible, controlled color temperature, calibrated source of low level illumination; and
    comparing an output image generated from said remote visual acuity chart by said night vision apparatus during absence of said competing local illumination with an output image generated during presence of said competing local illumination;
    said comparing step including observer night vision apparatus visual acuity determinings during said absence and presence of said competing local illumination.

2. The inexpensive, in-the-field method of verifying night vision apparatus isolation from competing local illumination of claim 1 wherein said standard visual acuity chart is a U.S. Air Force 1951 tri-bar chart.

3. The inexpensive, in-the-field method of verifying night vision apparatus isolation from competing local illumination of claim 2 wherein said step of comparing an output image generated from said remote visual acuity chart by said night vision apparatus during absence of said competing local illumination with an output image generated during presence of said competing local illumination includes a criteria of resolving at least a horizontally disposed and a vertically disposed bar in said tri-bar chart in each of said absence and presence of competing local illumination conditions.

4. The inexpensive in-the-field method of verifying night vision apparatus isolation from competing local illumination of claim 1 wherein said step of illuminating said visual acuity chart from a distant household incandescent lamp point source, night vision apparatus compatible, controlled color temperature, calibrated source of low level illumination includes the steps of:

measuring a first radiant energy output level from said household incandescent lamp, point source apparatus at a first short lamp to measuring location distance, a short distance enabling said measuring within range of an off-the-shelf common measuring instrument; and disposing said visual acuity chart with respect to said household incandescent lamp, point source apparatus at a second greater separation distance, a distance determined mathematically from said measuring step and an inverse square law mathematical relationship to generate a desired night vision apparatus testing degree of ultra low level visual acuity chart illumination.

5. The inexpensive, in-the-field method of verifying night vision apparatus isolation from competing local illumination of claim 4 wherein said step of measuring a first radiant energy output level from said household incandescent lamp, point source apparatus at a first short lamp to measuring location distance includes measuring with a hand-held portable battery energized illuminance measuring instrument.

6. The inexpensive, in-the-field method of verifying night vision apparatus isolation from competing local illumination of claim 1 wherein said controlled color temperature includes maintaining said lamp at a constant operating voltage between an initial short distance measuring of an output from said lamp and said step of illuminating said visual acuity chart from a distant incandescent lamp point source, night vision apparatus compatible, controlled color temperature, calibrated source of low level illumination.

7. The inexpensive, in-the-field method of verifying night vision apparatus isolation from competing local illumination of claim 1 wherein said step of illuminating said visual acuity chart from a distant incandescent lamp point source of low level illumination includes generating said illumination with a seven and one half watt household incandescent lamp, measuring illumination from said lamp at a first dose distance and moving said lamp to a mathematically determined greater distance from said visual acuity chart.

8. The inexpensive, in-the-field method of verifying night vision apparatus isolation from competing local illumination of claim 1 wherein said household incandescent lamp is a frosting coated seven and one-half watt 115 to 120 volt household lamp.

9. The inexpensive, in-the-field method of verifying night vision apparatus isolation from competing local illumination of claim 1 wherein said night vision apparatus visual acuity determining include multiple person observations of said visual acuity chart.

10. The economical method of accomplishing calibrated ultra low level test scene illumination for night vision apparatus performance evaluating, said method comprising the steps of:
supplying said illumination from a low wattage incandescent lamp of known black body radiation distribution and color temperature operating characteristics;
limiting test scene irradiating output from said incandescent lamp with an intervening pinhole aperture point source apparatus;
measuring a first radiant energy output level from said incandescent lamp and pinhole aperture apparatus at a first short lamp to measuring location distance, a short distance enabling said measuring within range of an off-the-shelf common measuring instrument; and
disposing said test scene with respect to said lamp and said pinhole aperture point source apparatus at a second greater separation distance, a distance determined mathematically from said measuring step and an inverse square law mathematical relationship to generate a desired night vision apparatus testing degree of said ultra low level scene illumination.

11. The economical method of accomplishing calibrated ultra low level test scene illumination for night vision apparatus performance evaluating of claim 10 further including the step of comparing output images from said night vision. apparatus generated during a plurality of differing ambient lighting conditions to identify unwanted ambient light interference with said night vision apparatus.

12. The economical method of accomplishing calibrated ultra low level test scene illumination for night vision apparatus performance evaluating of claim 10 wherein said step of supplying said illumination from a low wattage incandescent lamp of known black body radiation distribution and color temperature operating characteristics includes generating radiant energy from a seven and one-half watt household lamp operating at a constant input voltage.

13. The economical method of accomplishing calibrated ultra low level test scene illumination for night vision apparatus performance evaluating of claim 10 wherein said step of measuring a first radiant energy output level from said incandescent lamp and pinhole aperture apparatus with an off-the-shelf common measuring instrument includes measuring with a hand-held portable battery operated illumination measuring instrument.

14. The economical method of accomplishing calibrated ultra low level test scene illumination for night vision apparatus performance evaluating of claim 13 wherein said step of measuring a first radiant energy output level from said incandescent lamp and pinhole aperture apparatus with an off-the-half common measuring instrument includes measuring with a illumination measuring instrument having a 0.01 footcandle measuring resolution.

15. The economical method of accomplishing calibrated ultra low level test scene illumination for night vision apparatus performance evaluating of claim 11 wherein said ultra low level scene illumination in said disposing step is a level below 0.01 foot-candle in illumination intensity.

16. The economical method of accomplishing calibrated ultra low level test scene illumination for night vision apparatus performance evaluating of claim 11 wherein:
said short distance measuring step is responsive to a visible spectrum related illumination level;
said disposing step achieves a night vision apparatus spectrum responsive irradiance level measurement; and
said visible spectrum related illumination and said night vision apparatus spectrum responsive irradiance level are related by a mathematical constant under constant incandescent lamp color temp conditions.

17. The economical method of testing for aircraft cockpit illumination interference with adjacent night vision apparatus performance; said method comprising the steps of:
selecting an illumination source inclusive of a small wattage incandescent lamp of known blackbody radiation distribution and color temperature operating characteristics and a pinhole aperture element for illuminating a test target to be viewed by said night vision apparatus;
measuring an output from said illumination source at a known small first separation distance and using off-the-shelf first input level-capable illumination measuring instrumentation;
locating a test target to be viewed by said night vision apparatus at a greater second separation distance from said illumination source and within view of a crew station location of said aircraft cockpit;
said greater second separation distance from said illumination source generating a lesser second level illumination of said test target by said source, an illumination level below resolution capability of said illumination measuring instrumentation but within input operating range of said night vision apparatus;

said greater second separation distance from said illumination source being determined from said small first separation distance measured output of said illumination source, by an inverse square law mathematical relationship between said first and second measured distances and said input operating range of said night vision apparatus; and comparing night vision apparatus viewed images of said test target with said aircraft cockpit illumination energized and de-energized to identify cockpit illumination sourced degradations incurred therein.

18. The economical method of testing for aircraft cockpit illumination interference with adjacent night vision apparatus performance of claim 17 wherein said selecting step small wattage incandescent lamp is a household lamp and said step includes operating said lamp in presence of an output path inclusive of a pinhole aperture.

19. The economical method of testing for aircraft cockpit illumination interference with adjacent night vision apparatus performance of claim 17 wherein said step of measuring an output from said illumination source at a known small first separation distance includes measuring with a measuring instrument having 0.01 lux resolution and at a distance of one foot.

20. The economical method of testing for aircraft cockpit illumination interference with adjacent night vision apparatus performance of claim 17 wherein said step of selecting an illumination source inclusive of a small wattage incandescent lamp of known black body radiation distribution and color temperature operating characteristics includes determining a fixed constant relationship existing between visible light illuminance generated by said illumination source and night vision apparatus sensitive irradiance for said night vision apparatus.

21. The economical method of testing for aircraft cockpit illumination interference with adjacent night vision apparatus performance of claim 17 wherein said step of locating a test target to be viewed by said night vision apparatus at a greater second separation distance from said illumination source and within view of a crew station location of said aircraft cockpit includes locating said test target at a second separating distance in excess of fourteen feet from said illumination source.

22. Night vision equipment ambient lighting interference determining apparatus comprising the combination of:

a visual acuity chart having a plurality of groups of interspersed light and dark shaded bar patterns of varying spatial frequency dispersed over an active light color surface thereof;

a low level illumination source including a household incandescent filament lamp and a pinhole aperture element located intermediate said lamp and said visual acuity chart;

said low level illumination source being disposed at a determined separation distance from said visual acuity chart and generating on said active surface thereof a selected low level irradiance of said interspersed light and dark shaded bar patterns;

said determined distance being achieved from a combined first measured output of said low level illumination source irradiance at a nearby separation distance and a mathematical determination, from said first measured output and said nearby separation distance length, of a second greater distance diminishing said illumination source output to said selected low level irradiance of said chart interspersed light and dark shaded bar patterns;

an irradiance measuring instrument having a measuring range exclusive of said selected low level irradiance but accommodative of said first measured output of said low level illumination source irradiance at said nearby separation distance;

an intermittently energizable source of radiant energy of potentially interfering radiation wavelength with respect to said night vision equipment; and means for evaluating an output image of said night vision equipment in presence of said selected low level irradiance of said chart interspersed light and dark shaded bar patterns and during each of an energized and non-energized state of said intermittently energizable source of radiant energy of potentially interfering radiation wavelength.

23. The night vision equipment ambient lighting interference determining apparatus of claim 22 wherein said lesser second level illumination of said test target comprises a low level night vision apparatus spectrum compatible irradiance level.

* * * * *